US007062365B1

(12) United States Patent
Fei

(10) Patent No.: US 7,062,365 B1
(45) Date of Patent: Jun. 13, 2006

(54) PERSONAL COMPUTER FOR AUTOMOBILES

(76) Inventor: Weibin Fei, 2361 Lowell Ave., Richmond, CA (US) 94804

( * ) Notice: Subject to any disclaimer, the term of this patent is extended or adjusted under 35 U.S.C. 154(b) by 0 days.

(21) Appl. No.: 10/654,434

(22) Filed: Sep. 3, 2003

(51) Int. Cl.
G06F 19/00 (2006.01)

(52) U.S. Cl. ......................................... 701/36
(58) Field of Classification Search .................... 701/1,
701/36; 345/163, 167; 307/10.1
See application file for complete search history.

(56) References Cited

U.S. PATENT DOCUMENTS

| 5,239,700 | A | * | 8/1993 | Guenther et al. ......... 455/158.4 |
| 5,555,502 | A | * | 9/1996 | Opel ........................... 701/36 |
| 5,635,926 | A | * | 6/1997 | Li ................................ 341/20 |
| 5,745,055 | A | * | 4/1998 | Redlich et al. ............... 341/20 |
| 5,751,274 | A | * | 5/1998 | Davis ......................... 345/157 |
| 5,907,318 | A | * | 5/1999 | Medina ....................... 345/163 |
| 5,949,345 | A | | 9/1999 | Bekert et al. |
| 6,009,363 | A | | 12/1999 | Beckert et al. |
| 6,175,789 | B1 | | 1/2001 | Beckert et al. |
| 6,202,008 | B1 | | 3/2001 | Beckert et al. |
| 6,249,744 | B1 | * | 6/2001 | Morita ....................... 701/213 |
| 6,253,122 | B1 | | 6/2001 | Razavi et al. |
| 6,253,131 | B1 | * | 6/2001 | Quigley et al. ............... 701/36 |
| 6,373,472 | B1 | * | 4/2002 | Palalau et al. ............... 345/173 |
| 6,418,362 | B1 | * | 7/2002 | St. Pierre et al. ............. 701/36 |
| 6,434,459 | B1 | | 8/2002 | Wong et al. |
| 6,476,794 | B1 | * | 11/2002 | Kataoka et al. ............. 345/161 |
| 6,526,335 | B1 | | 2/2003 | Treyz et al. |
| 6,611,250 | B1 | * | 8/2003 | Prince et al. ............... 345/163 |
| 6,708,086 | B1 | * | 3/2004 | Richard ........................ 701/1 |
| 6,871,121 | B1 | * | 3/2005 | Tomson ........................ 701/1 |
| 2002/0068605 | A1 | * | 6/2002 | Stanley ........................ 455/556 |
| 2002/0085043 | A1 | * | 7/2002 | Ribak ......................... 345/810 |
| 2004/0140951 | A1 | * | 7/2004 | Blish et al. ................. 345/163 |

FOREIGN PATENT DOCUMENTS

| EP | 0482234 A1 | * | 4/1992 |
| JP | 09-297629 | * | 11/1997 |
| WO | WO 01/03981 A1 | * | 1/2001 |

* cited by examiner

Primary Examiner—Michael J. Zanelli
(74) Attorney, Agent, or Firm—Michael I Kroll

(57) ABSTRACT

The present invention discloses a computer system for a vehicle. The computer system includes a processor having at least one supporting module connected to an automotive system of the vehicle. A display screen is connected to the processor for retrieving information data from the processor and selectively displaying information concerning the automotive system. The present invention further includes a means connected to the processor for controlling the functions of and operating the automotive system based upon the information displayed on said display screen.

1 Claim, 8 Drawing Sheets

PERSONAL COMPUTER FOR AUTOMOBILES

BACKGROUND OF THE INVENTION

1. Field of the Invention

The present invention relates generally to computer systems and, more specifically, to a personal computer integrated in a vehicle wherein the entire dashboard is formed as a display screen controlled using a central processor and supporting modules to work hand in hand with the vehicle automotive computers controlling the functions of the vehicle. The integrated vehicular computer includes a keyboard and mouse for inputting instructions as well as input peripherals such as a CD player and a DVD player. The operator of the integrated vehicular computer has all the benefits of a personal computer while driving without dangerously interfering with operating the vehicle. The integrated vehicular computer is further expandable to include wireless network connections.

2. Description of the Prior Art

Numerous other vehicular computers exist in the prior art. Typical of these are U.S. Pat. Nos. 5,949,345; 6,009,363; 6,175,789; 6,202,008; 6,253,122; 6,434,459 and 6,526,335. While these vehicular computer systems may be suitable for the purposes for which they were designed, they would not be as suitable for the purposes of the present invention, as hereinafter described.

U.S. Pat. No. 5,949,345

Inventor: Bekert et al.

Issued: Sep. 7, 1999

A vehicle computer system includes a display device that is configurable for viewing by a driver of a vehicle while the vehicle is moving. The display device is responsive to a processor that executes application programs in conjunction with an operating system. A plurality of sensors are used to indicate the position of the display device, to indicate vehicle motion, and to indicate the state of a chosen vehicle control such as a parking brake. Application programs open display windows in conjunction with the operating system. In opening a window, an application program can indicate whether the window will contain driving-related information. The operating system monitors the sensors and prevents the display of non-driving-related windows to the driver when the vehicle is in motion or when it has the potential for motion. Specifically, the operating system in such a situation hides any windows that have not been specified as being driving-related. Initially, all windows are assumed to contain non-driver related information; hence, they are hidden until it is determined what type of information they display.

U.S. Pat. No. 6,0090,363

Inventor: Beckert et al.

Issued: Dec. 28, 1999

A vehicle computer system has a housing sized to be mounted in a vehicle dashboard or other appropriate location. The housing includes a base unit and a faceplate. A first logic unit is mounted to the base unit to form a support module. The support module has two interfacing slots and can support connections to multiple peripheral devices. The support module facilitates high speed data exchange between the peripheral devices for streaming continuous audio or video data. The support module has a fast data memory to temporarily hold data being communicated between the peripheral devices. The support module also has a memory access circuit associated with each of the peripheral devices which designates at least one storage area within the fast data memory to hold data received from, or to be sent to, the associated peripheral device. The vehicle computer has a computer module which can be connected to or removed from one interfacing slot of the support module. A multi-bit bus (e.g., PCI bus) interfaces the computer module and the support module. The vehicle computer system also has a logic unit mounted to the faceplate to form a faceplate module. This module is detachably connected to the other interfacing slot of the support module.

U.S. Pat. No. 6,175,789

Inventor: Beckert et. al.

Issued: Jan. 16, 2001

A vehicle computer system has a housing sized to be mounted in a vehicle dashboard or other appropriate location. A computer is mounted within the housing and executes an open platform, multi-tasking operating system. The computer runs multiple applications on the operating system, including both vehicle-related applications (e.g., vehicle security application, vehicle diagnostics application, communications application, etc.) and non-vehicle-related applications (e.g., entertainment application, word processing, etc.). The applications may be supplied by the vehicle manufacturer and/or by the vehicle user.

U.S. Pat. No. 6,202,008

Inventor: Beckert et. al.

Issued: Mar. 13, 2001

A vehicle computer system has a housing sized to be mounted in a vehicle dashboard or other appropriate location. A computer is mounted within the housing and executes an open platform, multi-tasking operating system. The computer runs multiple applications on the operating system, including both vehicle-related applications (e.g., vehicle security application, vehicle diagnostics application, communications application, etc.) and non-vehicle-related applications (e.g., entertainment application, word processing, etc.). The computer system has an Internet wireless link to provide access to the Internet. One or more of the applications may utilize the link to access content on the Internet.

U.S. Pat. No. 6,253,122

Inventor: Razavi et. al.

Issued: Jun. 26, 2001

A dashboard for a vehicle, comprising a monitor which displays graphical images depicting dashboard instruments. In one embodiment, the monitor is a general purpose LCD graphics display coupled to a graphics generator. The graphics generator is a processor which executes a virtual dashboard software application. The processor receives vehicle information such as speed, fuel level, mileage and battery charge, and processes this information using the virtual dashboard software application to generate graphics signals which are transmitted to the monitor for display to the driver. The images displayed to the driver are determined by the virtual dashboard application, and not by the monitor itself. The displayed images are user-selectable so that they can be varied to suit the preferences of different drivers. The driver may alternately select different groups of images to view on the monitor using touch screens or speech commands.

U.S. Pat. No. 6,434,459

Inventor: Wong et. al.

Issued: Aug. 13, 2002

An automobile information system facilitates communication within clusters of components and among various clusters. Each cluster has logically related automobile components (e.g., environment control components, entertainment components, etc.) interconnected to a cluster controller connected via a data communications bus. The cluster controller is responsible with disseminating information received from an external source and exchanging information between two or more components. The cluster controller is implemented as a general-purpose computing device having an open platform operating system, which supports multiple applications and provides interfaces to the components. The cluster controllers are interconnected via another data communications bus to enable information flow between clusters. In this manner, any component in one cluster can share information with any component in another cluster without need for dedicated wiring or specially written code.

U.S. Pat. No. 6,526,335

Inventor: Treyz et. al.

Issued: Feb. 25, 2003

An automobile personal computer system is provided. A user of the system may wirelessly interact with merchants, communications facilities, information providers, computers at the home or office, and other entities. Such interactions may involve local wireless links and remote wireless links. Wireless communications may involve satellite transmissions, cellular transmissions, short-range wireless transmissions, etc. Products may be purchased using voice commands or by interacting with displays in the automobile. The automobile's location and functions may be monitored and controlled. Location information and other information particular to the user may be used to target promotions to the user. The user may obtain information on the goods or services available at a merchant while driving and may initiate a purchase transaction for those goods or services.

SUMMARY OF THE PRESENT INVENTION

The present invention relates generally to computer systems and, more specifically, to a personal computer integrated in a vehicle wherein the entire dashboard is formed as a display screen controlled using a central processor and supporting modules to work hand in hand with the vehicle automotive computers controlling functions of the vehicles. The integrated vehicular computer includes a keyboard and mouse for inputting instructions as well as input peripherals such as a CD player and a DVD player. The operator of the integrated vehicular computer has all the benefits of a personal computer while driving without dangerously interfering with operating the vehicle. The integrated vehicular computer is further expandable to include wireless network connections.

A primary object of the present invention is to provide a vehicular computer system that overcomes the short comings of the prior art.

Another secondary object of the present invention is to provide vehicular computer system that incorporates a personal computer within the body of a vehicle.

Yet another object of the present invention is to provide a vehicular computer system that works in conjunction with the automotive computer system that contains for operating the vehicle.

Still yet another object of the present invention is to provide a vehicular computer system having a display screen at least partially covering the dashboard in front of the driver.

An even further object of the present invention is to provide a vehicular computer system having a display screen positioned on the dashboard in front of the passenger seat.

Yet another object of the present invention is to provide a vehicular computer system having display screens positioned on a rear side of each of the drivers seat and passenger seat.

An even further object of the present invention is to provide a vehicular computer system wherein the display screen is a touch screen.

Still another object of the present invention is to provide a vehicular computer system having a keyboard positioned on the steering wheel of the vehicle.

A further object of the present invention is to provide a vehicular computer system having a mouse for controlling the functions thereof.

Still another object of the present invention is to provide a vehicular computer system wherein the mouse is selectively controllable by a user's left or right foot.

Another object of the present invention is to provide a vehicular computer system wherein the mouse is positioned on the steering wheel.

A further object of the present invention is to provide a vehicular computer system having a plurality of peripheral inputs include at least one of CD-ROM, DVD-ROM and Mini-and Disc Player.

An even further object of the present invention is to provide a vehicular computer system that allows the user to control the operation of vehicular systems.

Yet another object of the present invention is to provide a vehicular computer system that displays information about the operation of the vehicle on the display screen positioned in front of the driver of the vehicle.

A further object of the present invention is to provide a vehicular computer system that uses an open platform, multi-tasking, and multi-user operating system.

Yet another object of the present invention is to provide a vehicular computer system that allows a user to run a plurality of programs simultaneously.

An even further object of the present invention is to provide a vehicular computer system wherein a handheld display may be wirelessly connected to the processor.

Still another object of the present invention is to provide a vehicular computer system wherein the devices used to control the computer system are positioned within a support frame.

Another object of the present invention is to provide a vehicular computer system for controlling the movement of mirrors in the vehicle.

Still another object of the present invention is to provide a vehicular computer system having a global positioning system connected thereto.

A further object of the present invention is to provide a vehicular computer system for controlling a plurality of cameras positioned on the exterior and interior of the vehicle.

Still another object of the present invention is to provide a vehicular computer system for containers that is simple and easy to use.

Still yet another object of the present invention is to provide a vehicular computer system that is inexpensive to manufacture and use.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

DESCRIPTION OF THE REFERENCED NUMERALS

Figure 1:
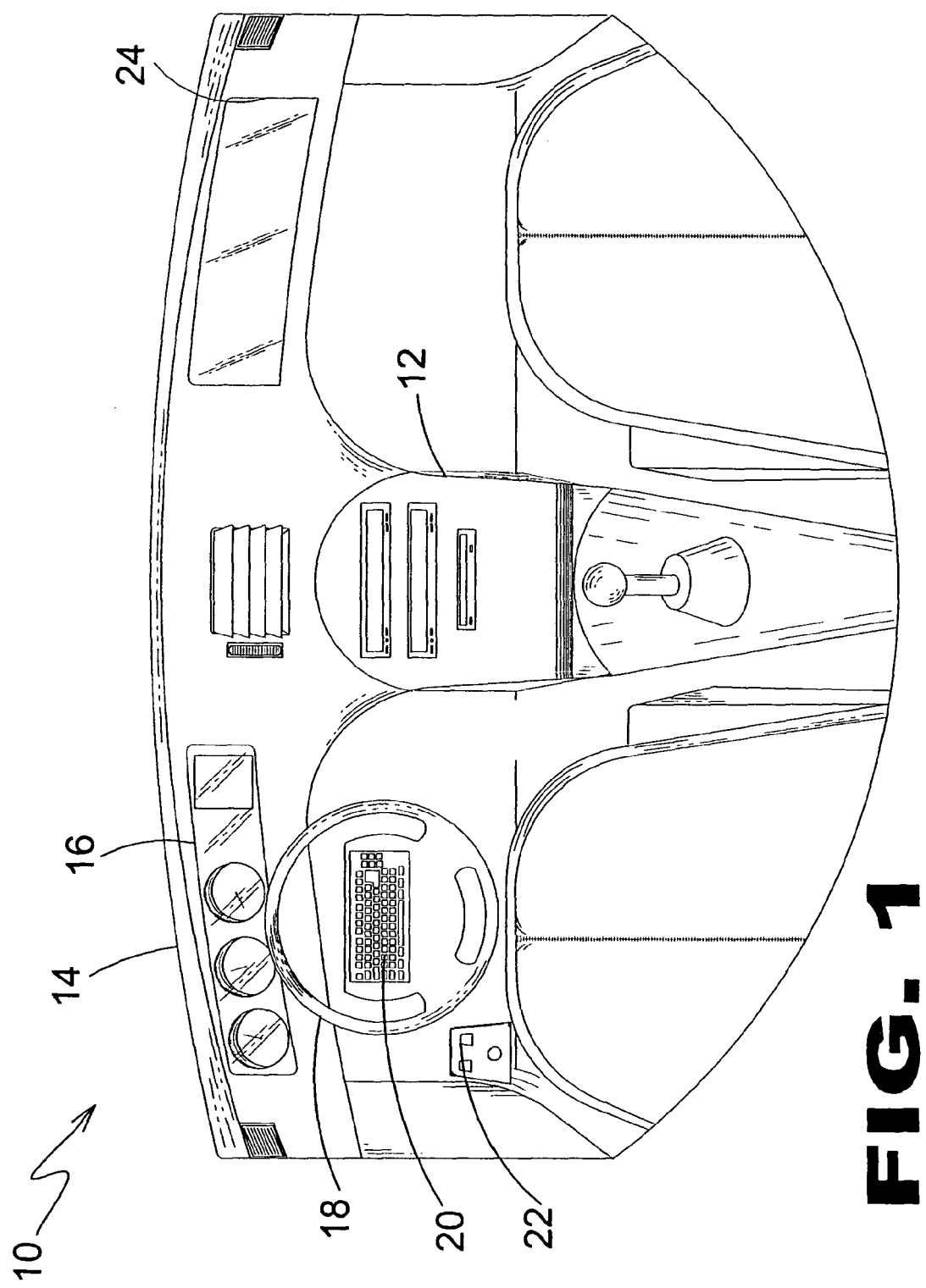
FIG. 1 is an illustrative view of the passenger compartment of a vehicle containing the vehicular computer system of the present invention.

Turning now descriptively to the drawings, in which similar reference characters denote similar elements throughout the several views, the Figures illustrate the vehicular computer system of the present invention. With regard to the reference numerals used, the following numbering is used throughout the various drawing figures.

- 10 vehicular computer system of the present invention
- 12 console
- 14 dashboard
- 16 display screen
- 17 outer wheel of steering wheel
- 18 steering wheel
- 19 inner cylinder of steering wheel
- 20 keyboard
- 21 third display screen
- 22 foot mouse
- 23 fourth display screen
- 24 second display screen
- 26 first field
- 28 second field
- 30 third field
- 32 fourth field
- 34 scroll bar
- 36 steering wheel mouse
- 38 first action button
- 40 second action button
- 41 input peripherals
- 42 first device
- 44 second device
- 46 third device
- 48 fourth device
- 50 camera
- 52 microphone
- 53 input/output peripherals

DETAILED DESCRIPTION OF THE PREFERRED EMBODIMENT

The following discussion describes in detail one embodiment of the invention. This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 8 illustrate a vehicular computer system of the present invention indicated generally by the numeral 10.

FIG. 1 is an illustrative view of the passenger compartment of a vehicle containing the vehicular computer system of the present invention. The vehicular computer system 10 of the present invention includes a console 12 which houses a processor 13 for controlling the vehicular computer system 10. The vehicular computer system 10 further includes a display screen 16 for graphically displaying data thereon. The display screen 16 is preferably positioned in the dashboard 14 of the vehicle directly in front of the driver of the vehicle. The display screen 16 is able to display all the information that the driver of the vehicle may need to know. For example, the display screen 16 is able to selectively display all the gauges associated with a motor vehicle, including, but not limited to, the speedometer, temperature gauge, RRM meter, gas level meter and odometer. Each gauge is preferably located in an independent data field contained on the display screen 16. The display screen 16 also contains a data field that selectively displays command options. This allows the driver of the vehicle to navigate and control a plurality of automotive systems as well as navigate and control a plurality of peripheral devices connected to the vehicular computer system 10 of the present invention. The display screen 16 will be discussed hereinafter with specific reference to FIG. 2. The vehicular computer system 10 of the present invention further includes a second display screen 24 for displaying graphical images thereon. The second display screen 24 is preferably positioned on the dashboard 14 in front of the passenger seat so as to allow a person in the passenger seat to view the second display screen 24.

Figure 3:
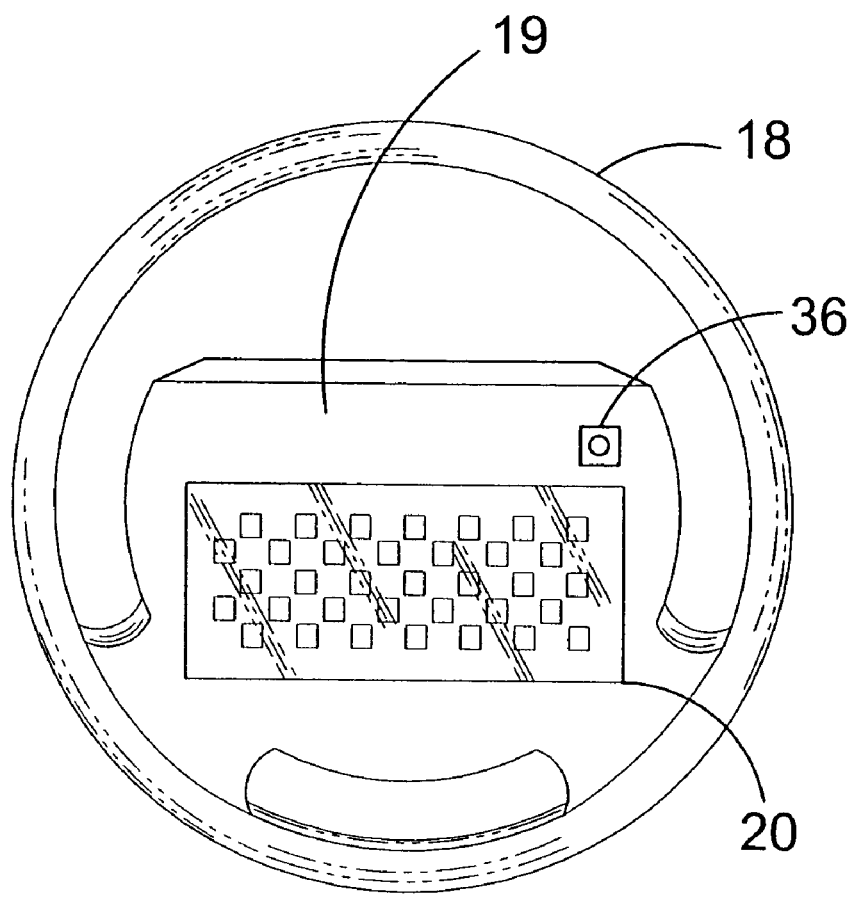
FIG. 3 is a front view of the steering wheel of a vehicle having the keyboard and mouse for inputting information into the vehicular computer system of the present invention.
Figure 4:
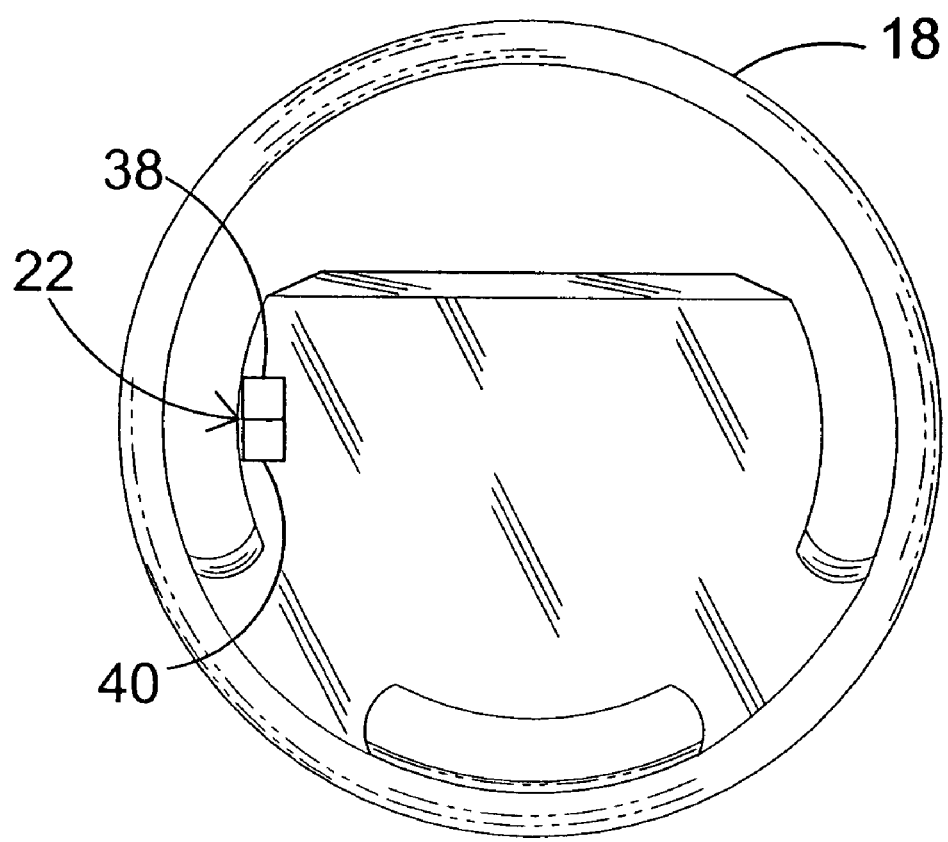
FIG. 4 is a rear view of the steering wheel of the vehicle having the vehicular computer system of the present invention installed therein showing the positioning of the action buttons of the mouse.

The vehicular computer system 10 of the present invention is selectively controllable by a keyboard 20 and a mouse 22. The keyboard 20 is preferably positioned on a steering wheel 18 of the vehicle. Alternatively, if the vehicle is guided using a means other than the steering wheel 18, the keyboard 18 is positioned on a support column thereby allowing the user easy access for controlling the vehicular computer system 10 while driving. The keyboard 18 allows the user to input information into the vehicular computer system 10. The keyboard 18 may also be used to control the various peripheral devices connected to the vehicular computer system 10. The mouse 22 also allows the user to navigate and control the vehicular computer system 10 of the present invention. The mouse 22 functions in a similar fashion to a mouse used with a personal computer system. As shown herein, the mouse 22 is positioned on the floor of the passenger compartment thereby allowing a user to operate the mouse with either the right or left foot. The mouse 22 is selectively moveable by sensing a pressure placed thereon by a foot of the user. Upon detecting the direction of the pressure, a mouse cursor on the display screen 16 is caused to move in that direction. The user can selectively activate programs or data stored on the vehicular computer system 10 by pressing downward on the mouse 22 in a direction toward the floor of the vehicle. The activation of programs is similar to clicking a mouse button of a mouse that is connected to a personal computer. Additionally, as shown in FIGS. 3 and 4, the mouse 22 can also be positioned on the steering wheel 18.

The vehicular computer system 10 of the present invention allows the driver of the vehicle to control every system within the vehicle. These systems include, but are not limited to, the stereo system and the climate control system. Additionally, the vehicular computer system 10 allows the user to monitor all of the automotive systems controlled by the various automotive computers of the vehicle. The vehicular computer system 10 is able to monitor the engine temperature, the level of brake fluid, the level of steering fluid, the level of oil, the level of coolant, and the level of windshield washing fluid. These systems are described for purposes of example only and the vehicular computer is able to monitor any system or component of the vehicle. The vehicular computer system 10 is also able to alert the user of the vehicle to any detrimental changes in any of the systems or components. Upon being notified by the vehicular computer system 10, the user is able to remedy any potential problem with the system or component.

Figure 2:
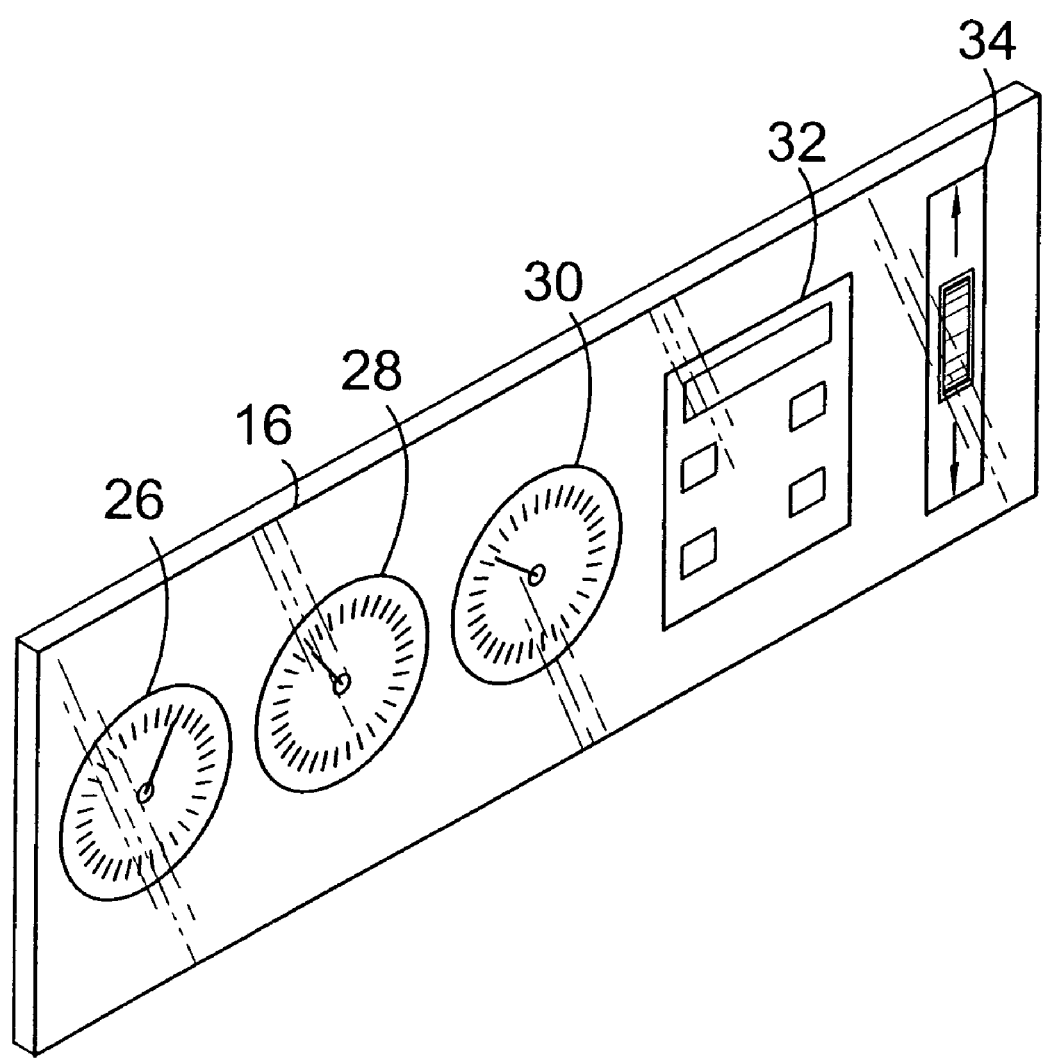
FIG. 2 is an enlarged view of the display screen of the vehicular computer system of the present invention.

FIG. 2 is an enlarged view of the display screen of the vehicular computer system of the present invention. The display screen 16 is preferably positioned in the dashboard 14 of the vehicle directly in front of the driver of the vehicle. The display screen 16 is able to display all the information that the driver of the vehicle may need to know where operating the vehicle. For example, the display screen 16 is able to selectively display all the gauges associated with a motor vehicle, including, but not limited to, the speedometer, temperature gauge, RRM meter, gas level meter and odometer. Each gauge is preferably located in an independent data field contained on the display screen 16. The display screen also contains a data field that selectively displays command options. This allows the driver of the vehicle to navigate and control a plurality of automotive systems as well as navigate and control a plurality of peripheral devices connected to the vehicular computer system 10 of the present invention.

The display screen 16 includes a first field 26, a second field 28, a third field 30 and a fourth field 32. The four fields 26, 28, 30, 32 are described for purposes of example only and the display screen 16 may include any number of display fields thereon. The display fields 26, 28, 30, 32 are all able to display data independently from one another so as to provide the user with graphical displays of multiple data sets. As shown herein, the first display field 26 displays a speedometer which notifies the user as to the rate of speed at which the vehicle is traveling. The second field 28 displays the temperature gauge which shows the user the current temperature under the hood of the vehicle. The third field 30 displays the revolutions per minute (RPM) of the engine. The different gauges displayed by the first three fields 26, 28, 30 are described for purposes of example only and the fields are able to display any data stored by the vehicular computer system 10 or data obtained by the vehicular computer system 10 from the plurality of automotive computers.

The fourth field 32 preferably displays a plurality of command buttons for controlling a plurality of devices connected to the vehicular computer system. The command buttons displayed in the fourth field 32 are selected by the user. The user, using the mouse 22 and the keyboard 18, can selectively determine which command buttons are displayed at any given time period. Additionally, the fourth field 32 can be selectively programmed by the user to cycle through a plurality of sets of command buttons thereby allowing the user to control many different devices without the distraction of manually switching the command buttons displayed in the fourth field 32. The fourth field 32 may contain command buttons that control a vehicle heat system, an air conditioning system, a defroster, windshield wipers, a plurality of viewing mirrors, a vehicle radio, a DVD player for playing DVD movies, a compact disc player and a volume level for speakers in the vehicle. The above systems are described for purposes of example only, and the command buttons displayed in the fourth field 32 are able to control any system or device connected to the vehicular computer system.

A scroll bar 34 is positioned adjacent to the fourth field 32 for scrolling through different sets of data displayed on the display fields 26, 28, 30, 32. Preferably, the scroll bar 34 is digital and is selectively controllable by using at least one of the keyboard 18 and mouse 22. For example, should a user decide to manually scroll through a plurality of command button contained in the fourth field 32, the user moves the mouse 22 over an up or down arrow of the scroll bar 34 and depresses the mouse 22 so as to activate the direction arrow. Thereafter, the user is able to scroll through the command buttons in the fourth field 34. Scrolling through command buttons is described for purposes of example only and the user may use the scroll bar 34 to scroll through any data set in any field as well as to scroll through data contained in different fields.

FIG. 3 is a front view of the steering wheel of a vehicle having the keyboard and mouse for inputting information into the vehicular computer system of the present invention. The vehicular computer system 10 is selectively controllable by the keyboard 20 and mouse 22. The keyboard 20 is preferably positioned on a steering wheel 18 of the vehicle. Alternatively, if the vehicle is controlled guided using a means other than the steering wheel 18, the keyboard 18 is positioned on a support column thereby allowing the user easy access for controlling the vehicular computer system 10 of the present invention. The keyboard 18 allows the user to input information into the vehicular computer system 10. The keyboard 18 may also be used to control the various peripheral devices connected to the vehicular computer system 10. The mouse 22 also allows the user to navigate and control the vehicular computer system 10 of the present invention. The mouse 22 functions in a similar fashion as a mouse that is used with a home personal computer system. As shown herein, the mouse 22 is positioned on the floor of the passenger compartment thereby allowing a user to operate the mouse using either the right or left foot. The mouse 22 is selectively moveable by sensing a pressure placed thereon by a foot of the user. Upon detecting the direction of the pressure, a mouse cursor on the display screen 16 is caused to move in that direction. The user can selectively activate programs or data stored on the vehicular computer system 10 by pressing downward on the mouse 22 in a direction toward the floor of the vehicle. The activation of programs is similar to clicking a mouse button of a mouse that is connected to a personal computer.

As shown in FIG. 3, the mouse is a trackball mouse 36. The trackball 36 is preferably positioned above the keyboard 20 on the steering wheel 18. The user is able to place a hand within an opening on the steering wheel 18 and control the trackball 36 with the thumb thereby gripping the steering wheel 18 on an inner cylinder 19 instead of an outer ring 17. Thus, the user is able to control the mouse cursor while driving the vehicle. Alternatively, the mouse 36 can be a touch pad that is positioned on the steering wheel 18. The touch pad senses the movement of a user's finger or thumb and controls the movement of the mouse cursor accordingly.

It is important to note that steering wheels generally includes an airbag for purposes of keeping the driver of the vehicle safe should the vehicle be involved in an accident. Thus, the keyboard should be positioned on the steering wheel in a manner that allows the airbag to inflate as intended. Furthermore, upon inflation of the airbag, the keyboard should remain in tact and fully functional.

Figure 6:
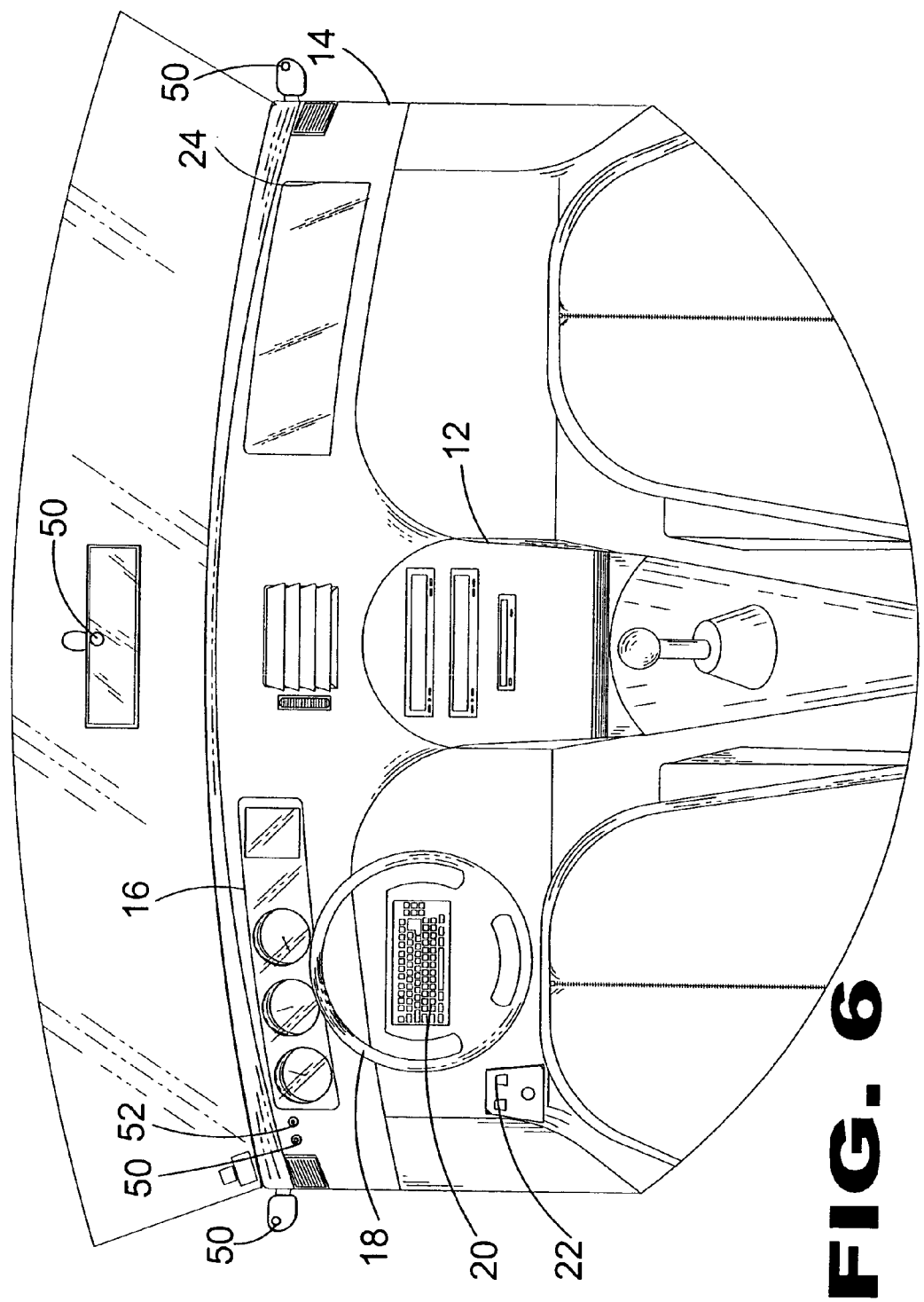
FIG. 6 is a perspective view of the passenger compartment of the vehicle having a microphone and a camera for use with the vehicular computer system of the present invention.

FIG. 4 is a rear view of the steering wheel 18 of the vehicle having the vehicular computer system 10 installed therein showing the positioning of the action buttons of the mouse 22. The vehicular computer system 10 is selectively controllable by the keyboard 20 and the mouse 22. The keyboard 20 is preferably positioned on the steering wheel 18 of the vehicle. Alternatively, if the vehicle is guided using means other than the steering wheel 18, the keyboard 18 is positioned on a support column thereby allowing the user easy access for controlling the vehicular computer system 10 of the present invention. The keyboard 18 allows the user to input information into the vehicular computer system 10. The keyboard 18 may also be used to control the various peripheral devices connected to the vehicular computer system 10. The mouse 22 also allows the user to navigate and control the vehicular computer system 10. The mouse 22 functions in a similar fashion as a mouse that is used with a home personal computer system. As shown in FIG. 6, the mouse 22 is positioned on the floor of the passenger compartment thereby allowing a user to operate the mouse 22 using either the right or left foot. The mouse 22 is selectively moveable by sensing a pressure placed thereon by a foot of the user. Upon detecting the direction of the pressure, the mouse cursor on the display screen 16 is caused to move in that direction. The user can selectively activate programs or data stored on the vehicular computer system 10 by pressing downward on the mouse 22 in a direction toward the floor of the vehicle. The activation of programs is similar to clicking a mouse button of a mouse that is connected to a personal computer.

This Figure shows a rear view of the steering wheel 18 that is depicted in FIG. 3. FIG. 4 shows the steering wheel including a first action button 38 and a second action button 40. The action buttons 38, 40 allow the user to select and activate any programs stored by the vehicular computer system 10. As discussed above in FIG. 3, the mouse cursor is controlled using the trackball 36. When the user places their hand within the opening in the steering wheel 18 located between the outer ring 17 and the inner cylinder 19, the user's fingers are able to depress the first and second actions buttons 38, 40 while the user's thumb controls the trackball 36.

Figure 5:
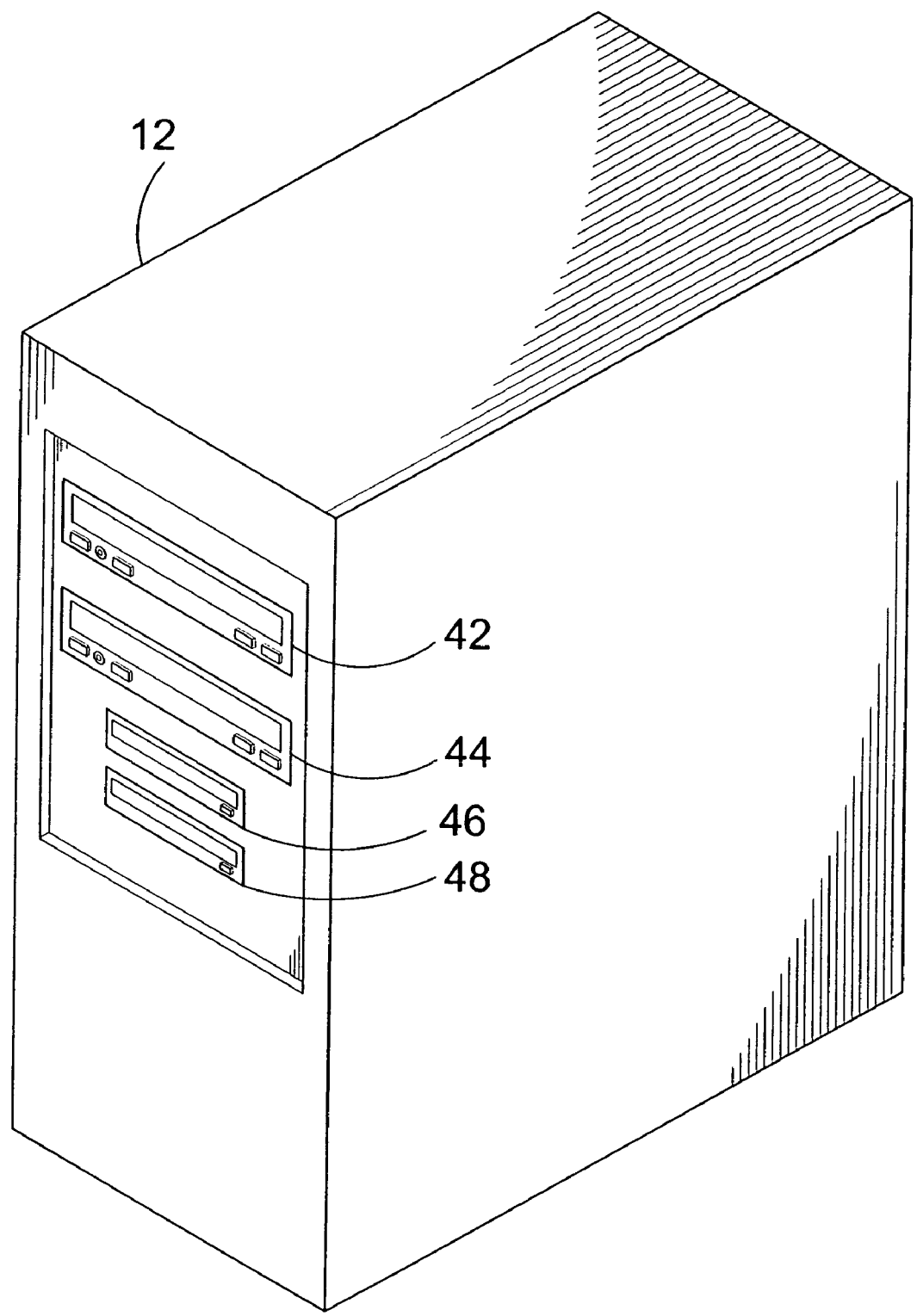
FIG. 5 is an enlarged view of the console housing the vehicular computer system of the present invention.

FIG. 5 is an enlarged view of the console housing the vehicular computer system of the present invention. The console 12 of the vehicular computer system 10 of the present invention is preferably positioned between the driver seat and the passenger seat of the vehicle. The console 12 includes a plurality of input and output devices that are controlled by the vehicular computer system 10 of the present invention. Additionally, the console 12 may include air vents for dispensing hot or cold air as directed by the climate control system of the vehicle. The console 12 includes a first device 42, a second device 44, a third device 46, and a fourth device 48. The devices 42, 44, 46, 48 are all input/output devices. The first device 42 is preferably a CD player for receiving and playing compact discs containing music. The second device 44 is preferably a DVD-ROM drive. The user may selectively add programs to the vehicular computer system 10 of the present invention using the DVD-ROM. Additionally, the DVD-ROM is able to play digital versatile discs containing movies and music. Data stored on these discs including information and movies are selectively displayed on at least one of the display screen 16 and the second display screen 24. The third device 46 is preferably a 3.5 inch floppy disc drive and the fourth device 48 is preferable a zip drive. The third and fourth devices, 46 and 48 respectively, enable a user to selective add data to or save data from the vehicular computer system 10 of the present invention. The devices 42, 44, 46, 48 are described above for purposes of example only and the devices may also include, but are not limited to, a CDRW drive, a minidisc player, a floppy drive, a zip drive and a cassette deck. The devices 42, 44, 46, 48 may be selectively accessed by the user using the keyboard 18 and the mouse 22 of the vehicular computer system 10.

FIG. 6 is a perspective view of the passenger compartment of the vehicle. Within the passenger compartment is a microphone 52 and a camera 50 for use with the vehicular computer system 10. The vehicular computer system 10 also includes the console 12 which houses the processor 13 for controlling the vehicular computer system 10. The vehicular computer system 10 further includes the display screen 16 for graphically displaying data thereon. The display screen 16 is preferably positioned in the dashboard 14 of the vehicle directly in front of the driver of the vehicle. The display screen 16 is able to display all the information that the driver of the vehicle may need to know when operating the vehicle. For example, the display screen 16 is able to selectively display all the gauges associated with the vehicle, including, but not limited to, the speedometer, temperature gauge, RRM meter, and odometer. Each gauge is preferably located in an independent data field contained on the display screen 16. The display screen also contains a data field that selectively displays command options. This allows the driver of the vehicle to navigate and control a plurality of automotive systems as well as navigate and control a plurality of peripheral devices connected to the vehicular computer system 10 of the present invention. The display screen 16 was discussed hereinbefore with specific reference to FIG. 2. The vehicular computer system 10 further includes the second display screen 24 for displaying graphical images thereon. The second display screen 24 is preferably positioned on the dashboard 14 in front of the passenger seat so as to allow a person in the passenger seat to view the second display screen 24.

The vehicular computer system 10 is selectively controllable by the keyboard 20 and mouse 22. The keyboard 20 is preferably positioned on the steering wheel 18 of the vehicle. Alternatively, if the vehicle is guided using a means other than the steering wheel 18, the keyboard 18 is positioned on the support column thereby allowing the user easy access for controlling the vehicular computer system 10 of the present invention. The keyboard 18 allows the user to input information into the vehicular computer system 10. The keyboard 18 may also be used to control the various peripheral devices connected to the vehicular computer system 10. The mouse 22 allows the user to navigate and control the vehicular computer system 10 of the present invention. The mouse 22 functions in a similar fashion as a mouse that is used with a home personal computer system. As shown in this Figure, the mouse 22 is positioned on the floor of the passenger compartment thereby allowing a user to operate the mouse using either the right or left foot. The mouse 22 is selectively moveable by sensing a pressure placed thereon by a foot of the user. Upon detecting the direction of the pressure, a mouse cursor on the display screen 16 is caused to move in that direction. The user can selectively activate programs or data stored on the vehicular computer system 10 by pressing downward on the mouse 22 in a direction toward the floor of the vehicle. The activation of programs is similar to clicking a mouse button of a mouse that is connected to a personal computer. Additionally, as shown in FIGS. 3 and 4, the mouse 22 can also be positioned on the steering wheel 18.

The vehicular computer system 10 of the present invention allows the driver of the vehicle to control every system within the vehicle. These systems include, but are not limited to the stereo system and the climate control system. Additionally, the vehicular computer system 10 allows the user to monitor all of the automotive systems controlled by the various automotive computers of the vehicle. The vehicular computer system 10 is able to monitor the engine temperature, the level of brake fluid, the level of steering fluid, the level of oil, the level of coolant, the level of gas and the level of windshield washing fluid. These systems are described for purposes of example only and the vehicular computer is able to monitor any system or component of the vehicle. The vehicular computer system 10 is also able to alert the user of the vehicle of any detrimental changes in any of the systems or components. Upon being notified by the vehicular computer system 10, the user is able to remedy any potential problem with the system or component.

As shown in FIG. 6, the vehicular computer system 10 of the present invention further includes at least one camera 50. The camera 50 is preferably positioned on a rear view mirror. The camera 50 is able to capture video and still images of the passengers in the vehicle as well as capture video of the area outside of the vehicle. The images captured by the camera 50 are selectively displayable on at least one of the display screen 16 and the second display screen 24. The user can selectively control the positioning and angle of the camera 50 as well as selectively control the type of image captured thereby using the keyboard 18 and mouse 22. Preferably, there are a plurality of cameras 50 positioned about the interior and exterior of the vehicle for providing a plurality of images that are selectively viewable by the user. The camera 50 is preferably positioned on the vehicle in at least one of a left side view mirror, a right side view mirror, a front bumper, a rear bumper, and a back seat of the vehicle. These positions are described for purposes of example only and the cameras 50 may be selectively positioned at any position on the interior or exterior of the vehicle.

The vehicular computer system 10 of the present invention further includes a microphone 52. The microphone 52 is connected to the vehicular computer system 10 of the present invention and is able to receive audible commands for controlling the vehicular computer system 10. Additionally, the microphone 52 can selectively function as a mouthpiece for a cellular telephone that is integrated within the vehicular computer system 10 of the present invention thereby allowing the user to make phone calls safely while driving.

Figure 7:
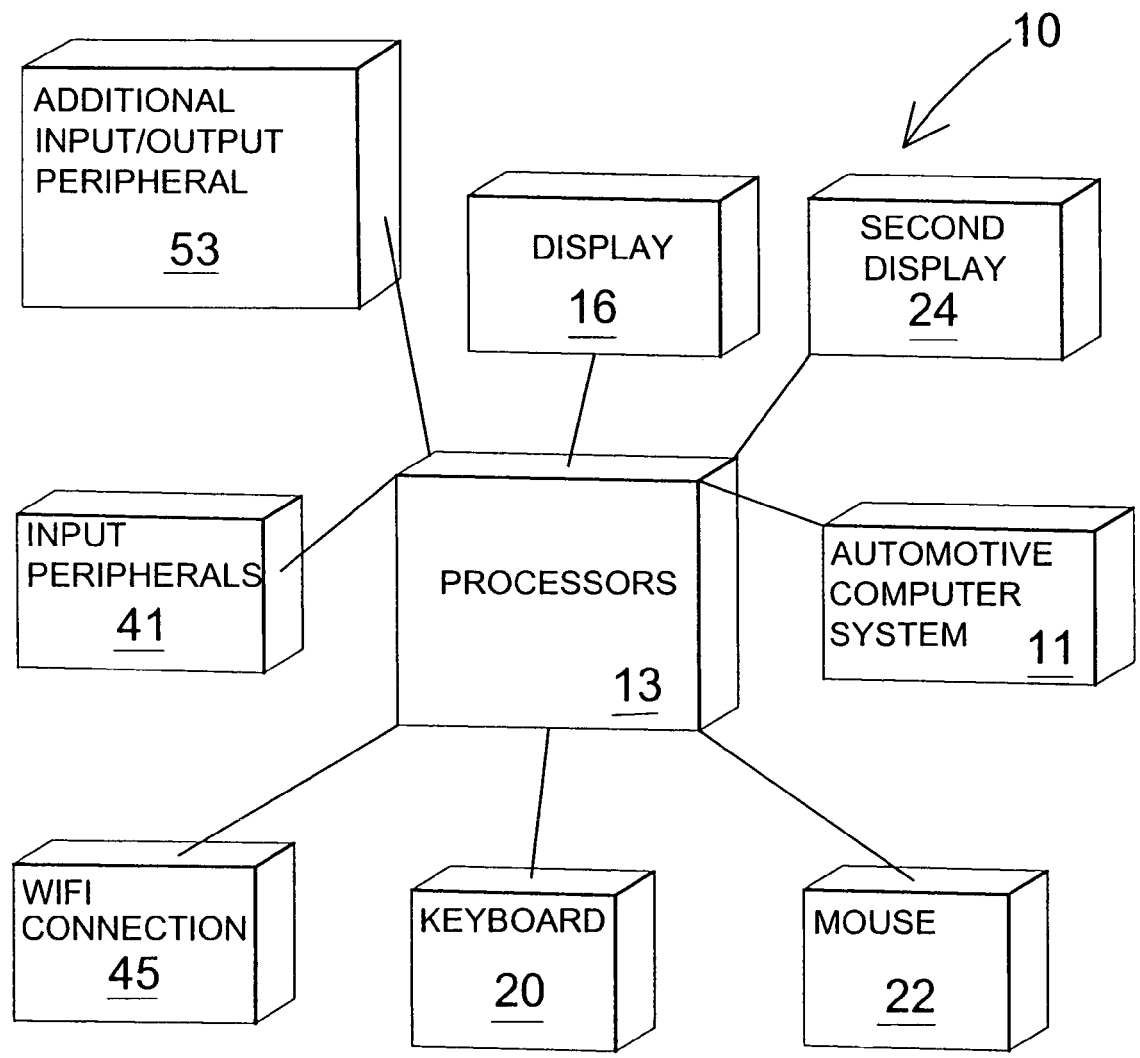
FIG. 7 is a block diagram of the vehicular computer system of the present invention.

FIG. 7 is a block diagram of the vehicular computer system 10. The vehicular computer system 10 includes the processor 13 for controlling the functions thereof. The processor 13 is connected to the display 16, the second display 24, the keyboard 20, the mouse 22 and input devices 41. The mouse 22 includes at least one of the foot pedal mouse as discussed in FIG. 1 and the trackball mouse 36 as discussed in FIGS. 3 and 4. Alternatively, the mouse may be configured as a touch screen. The mouse 22 and the keyboard 20 allow a user to selectively access data stored on the vehicular computer system 10. The input devices 41 include any combination of compact disc player 42, the DVD-ROM 44, the floppy disk drive 46, and the zip drive 48 as discussed above with specific reference to FIG. 5. Also, additional input/output peripherals 53 may be selectively connected to the processor 13. The display 16 includes the first field 26, second field 28, third field 30, and fourth field 32 as discussed above with specific reference to FIG. 2. The display 16 is able to graphically display to the user a plurality of data sets. Each respective one of the data sets is displayed independently from one another.

Additionally, the vehicular computer system 10 includes a WiFi connection 45 for selective connection to a network such as the internet. The WiFi connection is connected to the processor 13. The processor 13 directs the WiFi connection to send and receive data packets over the network to which it is connected. Upon receiving the data packets, the processor 13 directs the display 16 to display the information thereon. The WiFi connection 45 allows the user in the vehicle to access large quantities of information at a rapid speed.

Furthermore, the vehicular computer system 10 may includes a global positioning system connected to the processor 13. The global positioning system allows a user to communicate with a satellite for pinpointing the location of the vehicle on a map. Upon communicating with a satellite, the processor 13 may selectively display a map having a position indicator on at least one display screen connected thereto.

The processor 13 is also connected to the automotive computer system 11. The processor directs the automotive computer 11 to display pertinent data concerning the operation of the vehicle in at least one display field 26, 28, 30, 32 of the display. The user is able to control the systems monitored by the automotive computer system 11 by using the vehicular computer system 10 of the present invention.

Figure 8:
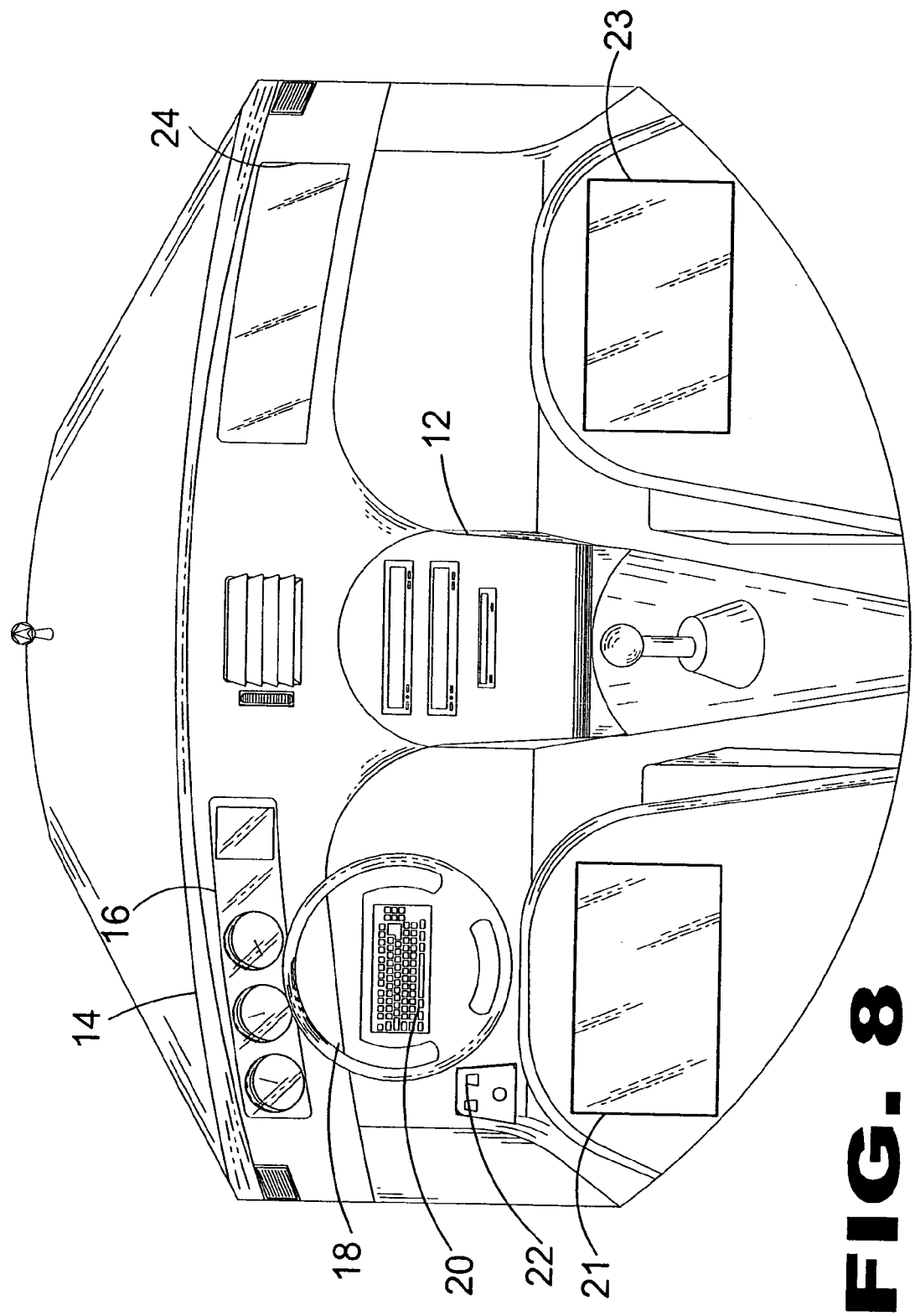
FIG. 8 is perspective view of the passenger compartment having a plurality of display screens for viewing output from the vehicular computer system of the present invention.

FIG. 8 is perspective view of the passenger compartment having a plurality of display screens for viewing an output from the vehicular computer system 10. The vehicular computer system 10 includes a console 12 housing the processor 13 for controlling the vehicular computer system 10. The vehicular computer system further includes the display screen 16 for graphically displaying data thereon. The display screen 16 is preferably positioned in the dashboard 14 of the vehicle directly in front of the driver of the vehicle. The display screen 16 is able to display all the information that the driver of the vehicle may need in order to operate the vehicle. For example, the display screen 16 is able to selectively display all the gauges associated with a motor vehicle, including, but not limited to, the speedometer, temperature gauge, RRM meter, and odometer. Each gauge is preferably located in an independent data field contained on the display screen 16. The display screen 16 also contains a data field that selectively displays command options. This allows the driver of the vehicle to navigate and control a plurality of automotive systems as well as navigate and control a plurality of peripheral devices connected to the vehicular computer system 10 of the present invention. The display screen 16 was discussed hereinbefore with specific reference to FIG. 2. The vehicular computer system 10 of the present invention further includes the second display screen 24 for displaying graphical images thereon. The second display screen 24 is preferably positioned on the dashboard 14 in front of the passenger seat so as to allow a person in the passenger seat to view the second display screen 24.

The vehicular computer system 10 of the present invention is selectively controllable by the keyboard 20 and mouse 22. The keyboard 20 is preferably positioned on the steering wheel 18 of the vehicle. Alternatively, if the vehicle is guided using a means other than the steering wheel 18, the keyboard 18 is positioned on a support column thereby allowing the user easy access for controlling the vehicular computer system 10. The keyboard 18 allows the user to input information into the vehicular computer system 10. The keyboard 18 may also be used to control the various peripheral devices connected to the vehicular computer system 10. The mouse 22 allows the user to navigate and control the vehicular computer system 10. The mouse 22 functions in a similar fashion as a mouse that is used with a home personal computer system. As shown herein, the mouse 22 is positioned on the floor of the passenger compartment thereby allowing a user to operate the mouse using either the right or left foot. The mouse 22 is selectively moveable by sensing a pressure placed thereon by a foot of the user. Upon detecting the direction of the pressure, the mouse cursor on the display screen 16 is caused to move in that direction. The user can selectively activate programs or data stored on the vehicular computer system 10 by pressing downward on the mouse 22 in a direction toward the floor of the vehicle. The activation of programs is similar to clicking the mouse button of a mouse that is connected to a personal computer. Additionally, as shown in FIGS. 3 and 4, the mouse 22 can also be positioned on the steering wheel 18.

The vehicular computer system 10 of the present invention allows the driver of the vehicle to control every system within the vehicle. These systems include, but are not limited to, the stereo system and the climate control system. Additionally, the vehicular computer system 10 allows the user to monitor all of the automotive systems controlled by the various automotive computers of the vehicle. The vehicular computer system 10 is able to monitor the engine temperature, the level of brake fluid, the level of steering fluid, the level of oil, the level of coolant, level of gas and the level of windshield washing fluid. These systems are described for purposes of example only and the vehicular computer is able to monitor any system or component of the vehicle. The vehicular computer system 10 is also able to alert the user of the vehicle of any detrimental changes in any of the systems or components. Upon being notified by the vehicular computer system 10, the user is able to remedy any potential problem with the system or component.

FIG. 8 shows the vehicular computer system 10 of the present invention further including a third display screen 21 and a fourth display screen 23. The third display screen 21 is preferably positioned on the back of the driver's seat and the fourth display screen 23 is preferable positioned on the back of the passenger seat. The third and fourth displays 21 and 23, respectively, allow persons seated in the back seat of the car to view information displayed by the vehicular computer system 10. This is particularly useful when the vehicular computer system 10 is playing a DVD disc containing video images thus enabling all occupants of the vehicle to view the images. Additionally, the third display screen 21 is able to display a different image than the fourth display 23.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A computer system for a vehicle comprising:
    a) a computer console including a processor having at least one supporting module connected to an automotive system of the vehicle located between driver and passenger seats;
    b) a first display screen on a dashboard of said vehicle facing said driver connected to said processor for retrieving information data from said processor and selectively displaying information concerning said automotive system;
    c) a computer keyboard mounted on a steering wheel of said vehicle connected to said processor for controlling functions of and operating said automotive system based upon the information displayed on said display screen;

d) said first display screen being able to selectively display all gauges associated with a motor vehicle, each gauge being in an independent data field on said display screen, said display screen also displaying command options for navigating and controlling peripheral devices in said vehicle;

e) a foot pedal mouse connected to said processor and positioned on floor of the vehicle, wherein said foot pedal mouse senses a direction of pressure placed thereon by a foot of a user and moves a mouse cursor across said first display screen in said direction, wherein upon reaching a display representative of a desired program, said program is selectively operable by depressing said foot pedal mouse;

f) a second display screen mounted on said dashboard facing the passenger seat next to the driver seat of said vehicle for displaying graphical images; and g) additional display screens on backs of front seats of said vehicle facing passengers in rear seats to view information displayed by the vehicular computer system including images from a DVD player in said console and controlled from said keyboard.

* * * * *